United States Patent
Marchesi

(10) Patent No.: US 9,493,098 B2
(45) Date of Patent: Nov. 15, 2016

(54) SEAT WITH TIPPING SEATING PORTION FOR VEHICLES, IN PARTICULAR FOR RAILWAY VEHICLES

(71) Applicant: CLERPREM S.p.A., Carre, Vicenza (IT)

(72) Inventor: Gian Roberto Marchesi, Vicenza (IT)

(73) Assignee: CLERPREM S.p.A., Carre, Vicenza (IT)

(*) Notice: Subject to any disclaimer, the term of this patent is extended or adjusted under 35 U.S.C. 154(b) by 0 days.

(21) Appl. No.: 14/216,023

(22) Filed: Mar. 17, 2014

(65) Prior Publication Data
US 2014/0284986 A1 Sep. 25, 2014

(30) Foreign Application Priority Data
Mar. 22, 2013 (EP) .................................... 13425043

(51) Int. Cl.
| | | |
|---|---|---|
| B60N 2/46 | (2006.01) | |
| B61D 33/00 | (2006.01) | |
| B60N 2/30 | (2006.01) | |
| B60N 2/02 | (2006.01) | |
| B60N 2/44 | (2006.01) | |

(52) U.S. Cl.
CPC ............... B60N 2/4606 (2013.01); B60N 2/02 (2013.01); B60N 2/3047 (2013.01); B61D 33/005 (2013.01); B61D 33/0035 (2013.01); B60N 2002/445 (2013.01)

(58) Field of Classification Search
CPC B60N 2/0224; B60N 2/0228; B60N 2/4606; B60N 2/3047; B60N 2/02; B60N 2002/445; A47C 7/46; B61D 33/035; B61D 33/005
See application file for complete search history.

(56) References Cited

U.S. PATENT DOCUMENTS

| 3,563,604 | A | * | 2/1971 | Barecki .................... 297/411.32 |
|---|---|---|---|---|
| 4,881,778 | A | * | 11/1989 | Stephenson et al. .... 297/411.39 |
| 5,829,836 | A | * | 11/1998 | Schumacher et al. ........ 297/257 |
| 6,776,457 | B2 | * | 8/2004 | Muin et al. .................... 297/331 |
| 7,083,146 | B2 | * | 8/2006 | Hiesener ..................... 244/118.6 |
| 7,726,607 | B2 | * | 6/2010 | Schumacher et al. .... 244/122 R |
| 8,070,233 | B2 | * | 12/2011 | Schumacher et al. ... 297/411.32 |
| 2009/0127911 | A1 | | 5/2009 | Schumacher et al. |

OTHER PUBLICATIONS

European Search Report for corresponding European Patent Application No. 13425043 mailed Aug. 6, 2013.

* cited by examiner

*Primary Examiner* — Philip Gabler
(74) *Attorney, Agent, or Firm* — Merchant & Gould P.C.

(57) ABSTRACT

A seating portion includes a support structure (10); a tipping seating portion (2), movably connected to the support structure to move between an open position and a closed position. At least one movable armrest (31, 32) is movably connected to the support structure to move between an open position and a closed position. A rotation device moves the seating portion from the open position to the closed position. The armrest (31, 32) is kinematically connected to the seating portion so that the armrest is moved from the position of use to the position of non-use by the movement of the seating portion from the position of use to that of non-use.

6 Claims, 14 Drawing Sheets

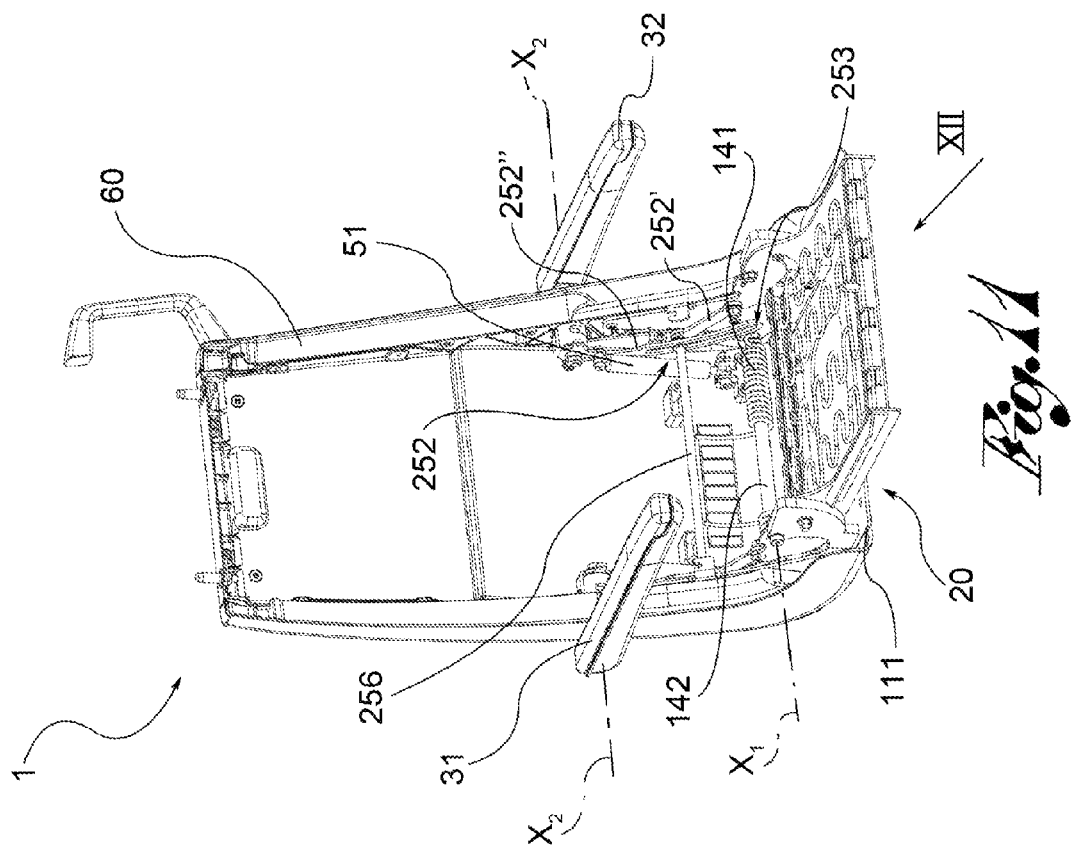
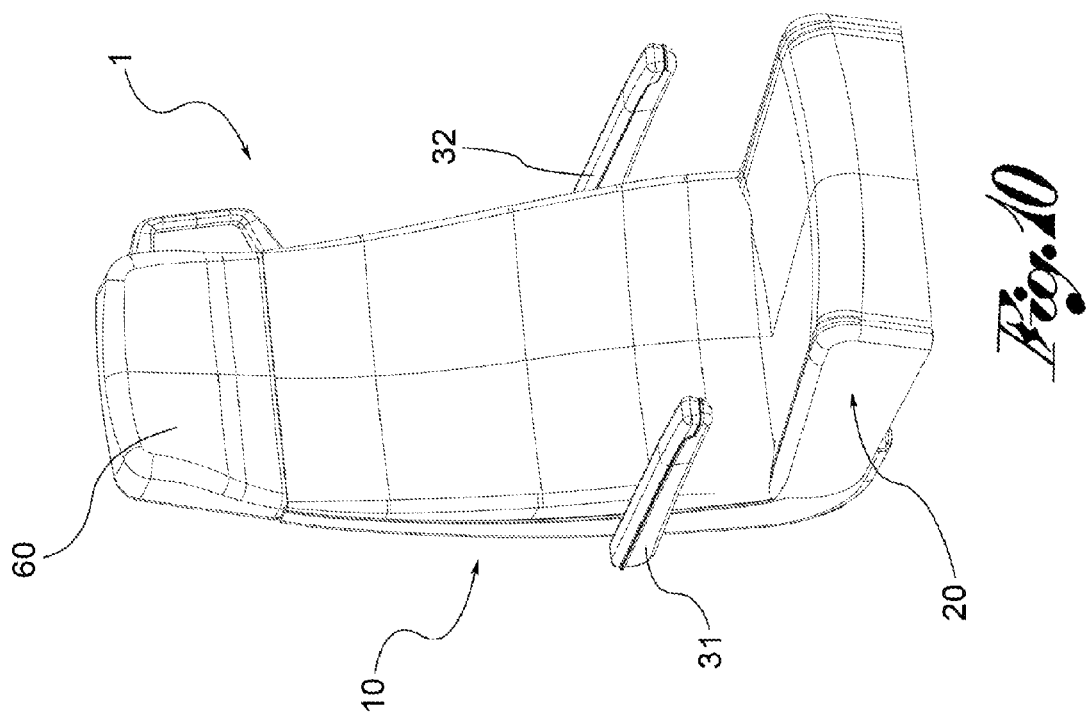

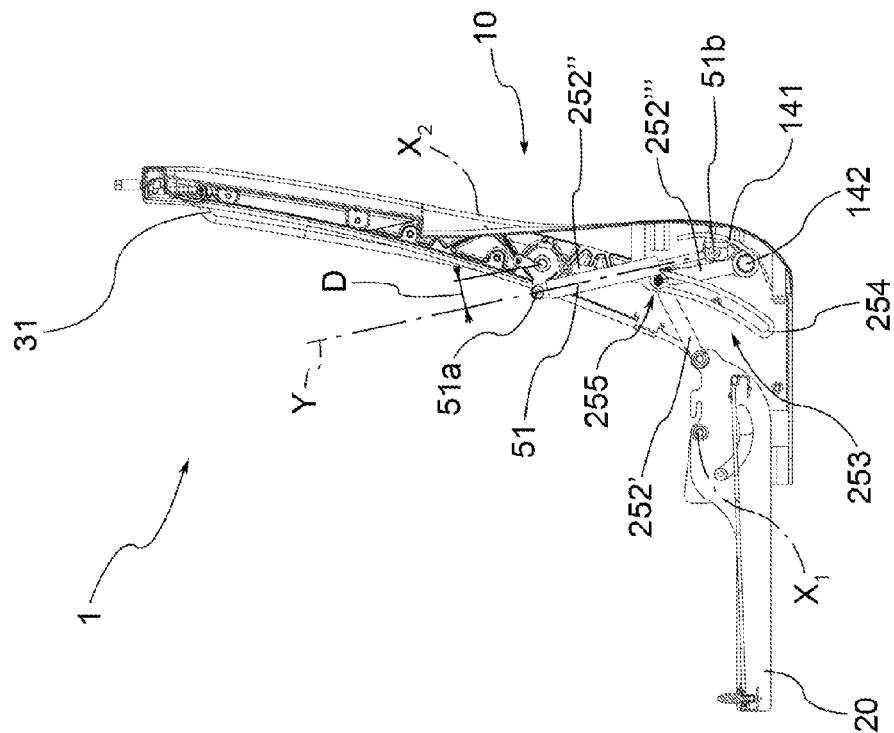
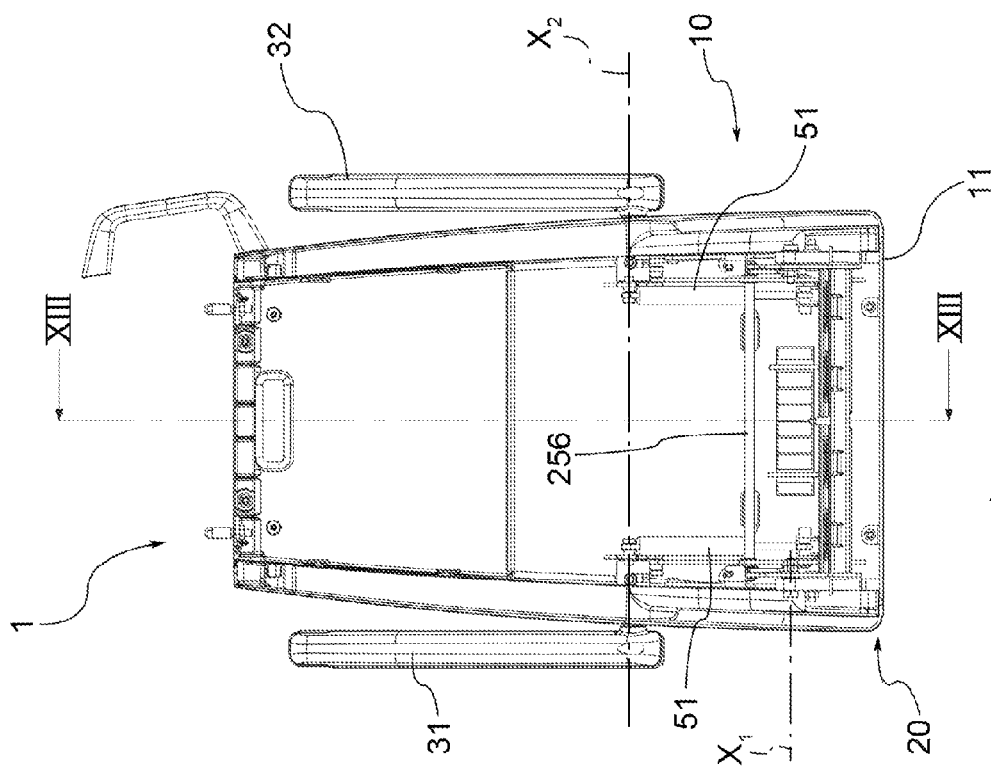
Fig.13
Fig.12

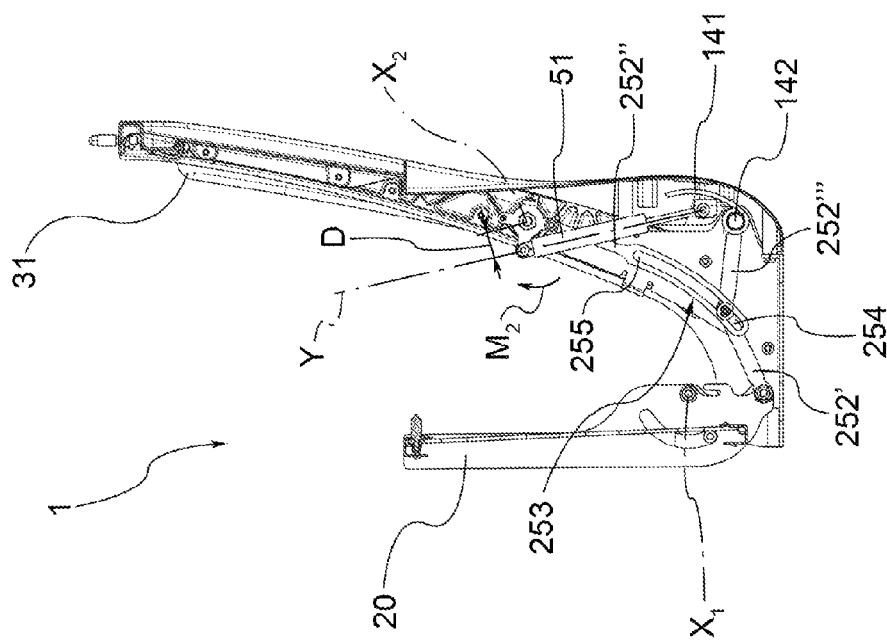
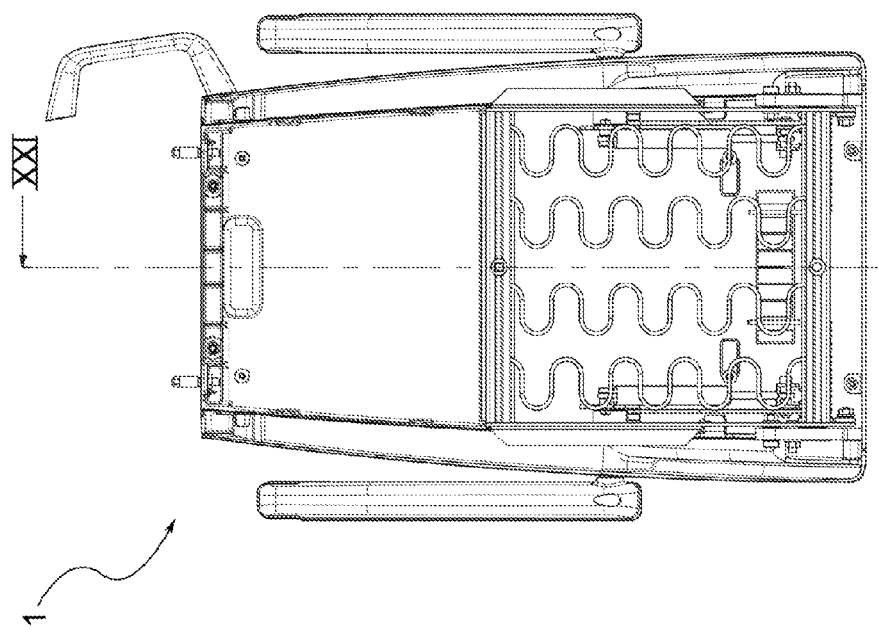

SEAT WITH TIPPING SEATING PORTION FOR VEHICLES, IN PARTICULAR FOR RAILWAY VEHICLES

This application claims benefit of Serial No. 13425043.0, filed 22 Mar. 2013 with the European Patent Office and which application is incorporated herein by reference. To the extent appropriate, a claim of priority is made to each of the above disclosed applications.

FIELD OF APPLICATION

The present invention relates to a seat with a tipping seating portion for vehicles, in particular for railway vehicles.

The seat according to the present invention may advantageously also be installed in passenger transport vehicles, such as trams, buses, underground trains and even on boats.

PRIOR ART

Railway seats with tipping seating portions are known. The seating portion rises automatically upwards, leaning against the backrest when the seat is free, in other words in the absence of a weight (passenger or luggage) placed on said seating portion. This way, when not in use, such seat occupies a reduced space compared to a traditional seat with a fixed seating portion. This type of seat is thus particularly suitable for being installed, for example, in areas of the vehicle configured mainly for the transit of passengers and used only secondarily and partially as areas for seated passengers.

To improve the comfort of the users, such seats may be provided with movable armrests, which can be manually rotated by the passenger between a position of use, in which they project from the backrest, and a position of non-use in which they are raised to the sides of the backrest.

The seats with tipping seating portions however are hardly ever provided with armrests given that these—if left in the position of use by the passenger at the moment of vacating the seat—become an obstruction and in practice cancel the positive, space-saving effect of the seat as a result of the tipping of the seating portion.

SUMMARY OF THE INVENTION

The purpose of the present invention is to make available a seat with a tipping seating portion for vehicles, in particular for railway vehicles, which despite being provided with armrests always assumes a space-saving configuration when left vacant by a user.

A further purpose of the present invention is to make available a seat with a tipping seating portion for vehicles, in particular for railway vehicles, which permits a movement of the armrests independent of the seating portion, when the seating portion is in the position of use.

A further purpose of the present invention is to make available a seat with a tipping seating portion for vehicles, in particular for railway vehicles, which permits the contemporary closing movement of the seating portion and of the armrests in a simple and automatic mechanical manner, without the need for motorised means.

A further purpose of the present invention is to make available a seat with a tipping seating portion for vehicles, in particular for railway vehicles, which is easy and economical to produce.

BRIEF DESCRIPTION OF THE DRAWINGS

The technical characteristics of the invention, according to the aforesaid purposes, can be seen clearly from the contents of the following claims and the advantages of the same will be more clearly comprehensible from the detailed description below, made with reference to the attached drawings, representing one or more embodiments thereof by way of non-limiting examples, wherein:

FIGS. 10 and 11 show a perspective view of a seat with a tipping seating portion according to a second embodiment of the invention shown respectively with or without the upholstery of the seating portion and of the backrest; and each pair of FIGS. 12 and 13, 14 and 15, 16 and 17, 18 and 19, 20 and 21 respectively show a front orthogonal view and a side view in cross-section of the support structure of the seat shown in FIG. 11, the front view being according to the arrow XII shown in FIG. 11, while the side view in cross-section being according to the cross-section plane XII, XV, XVII, XIX or XXI shown in the corresponding front view.

DETAILED DESCRIPTION

Figure 2:
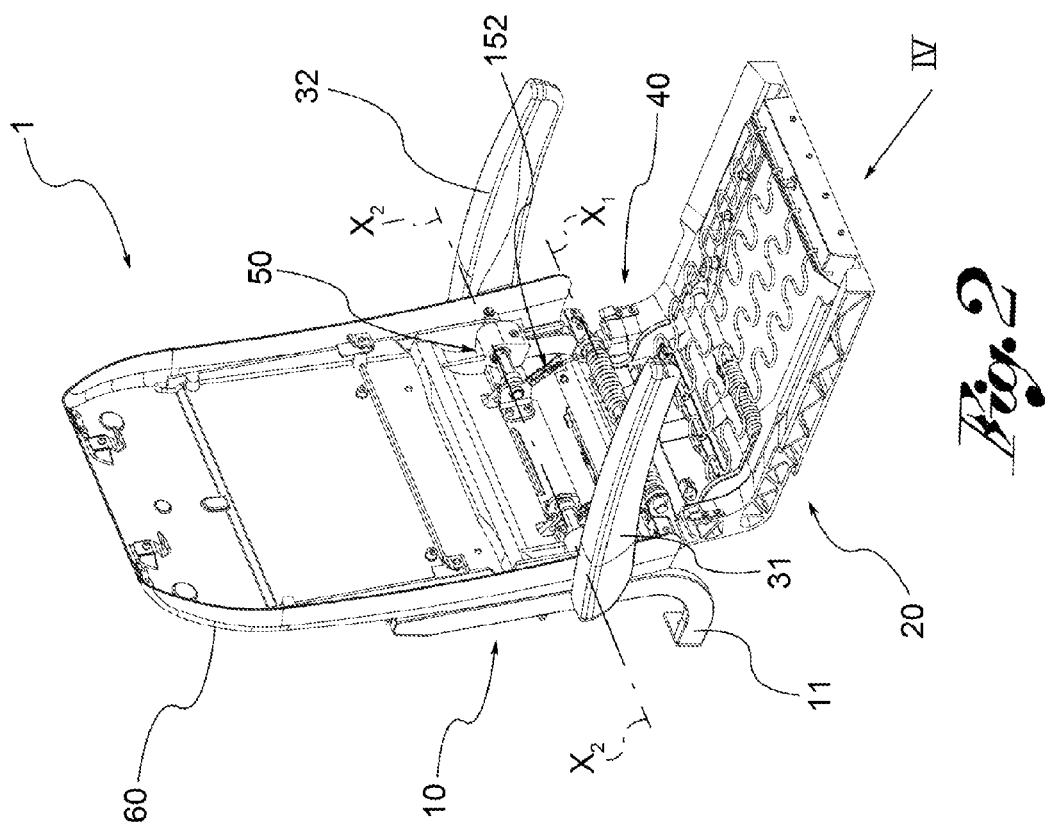
FIG. 2 shows a perspective view of the support structure of the seat in FIG. 2 without upholstery.
Figure 1:
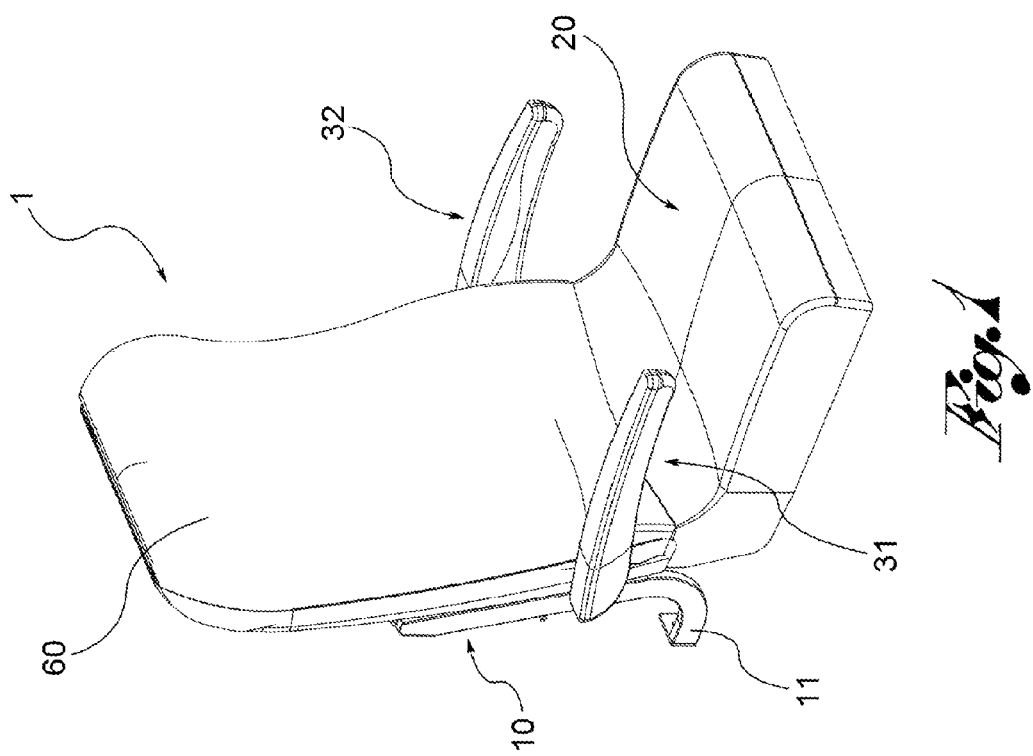
FIG. 1 shows a perspective view of a seat with a tipping seating portion according to a first embodiment of the invention.
Figure 3:
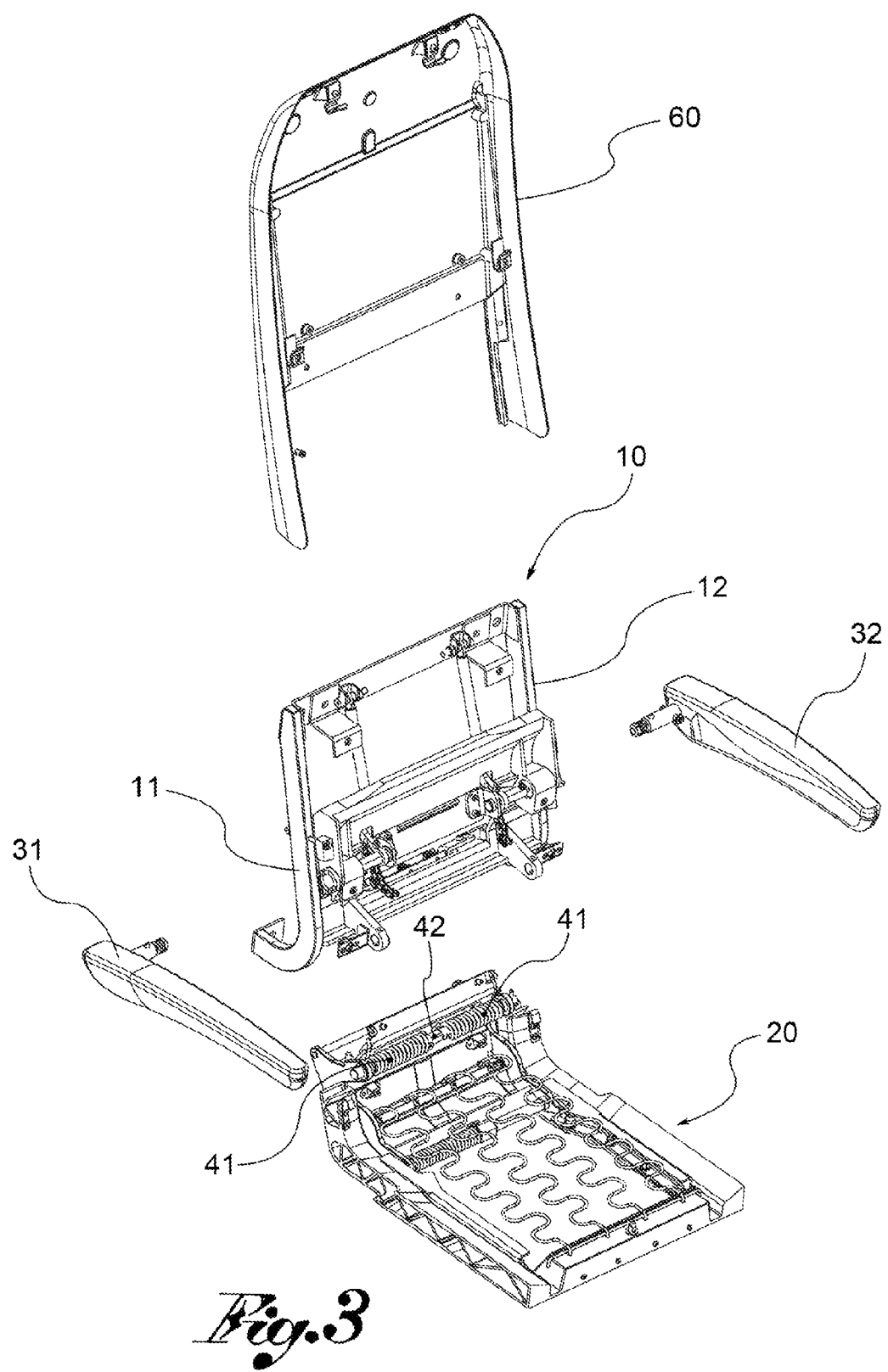
FIG. 3 shows an exploded view of the support structure shown in FIG. 2.
Figure 4:
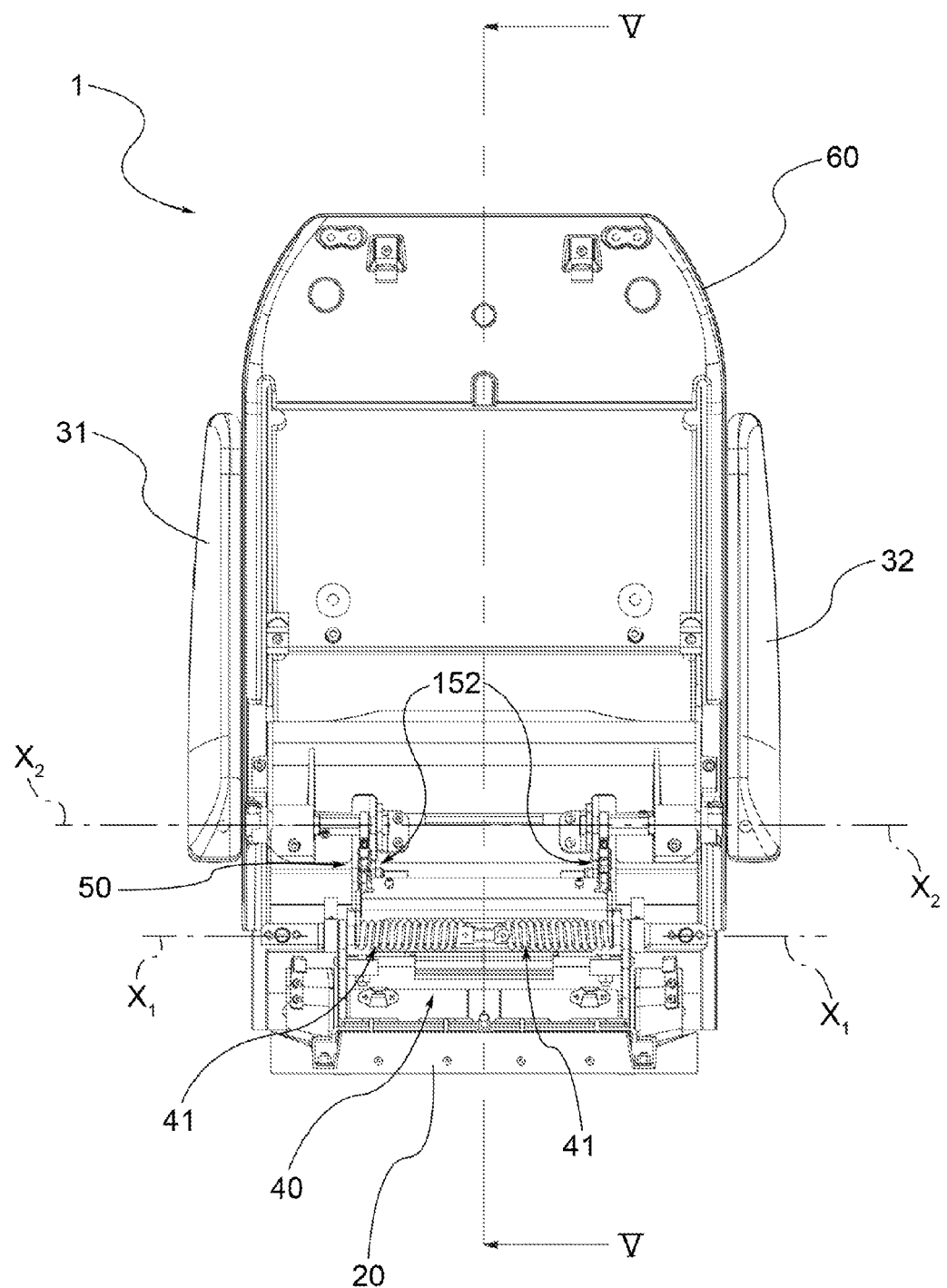
FIG. 4 shows a front orthogonal view of the support structure shown in FIG. 2 according to the arrow IV shown therein.

With reference to the appended drawings the seat with tipping seating portion for vehicles is globally denoted by reference numeral 1.

According to a general embodiment of the invention, the seat 1 comprises a support structure 10, configured to be anchored to a vehicle.

In particular, the support structure 10 may be of the type attaching to the wall, as shown in FIGS. 1 to 9, where two shaped arms 11, 12 are shown-positioned laterally to the support structure and each provided with an anchorage plate at a free end. Alternatively, the support structure 10 may be of the type attaching to a crossbeam, as shown in FIGS. 10 to 21, where the support structure is shown provided with an anchorage plate 111, positioned under the seating portion.

Preferably, the seat 1 comprises a backrest 60 associated to the support structure 10, as illustrated in the appended Drawings.

According to a general embodiment of the invention, the seat 1 further comprises:
 a tipping seating portion 20, movably connected to the support structure 10 to move between a position of use and a position of non-use, in which the seating portion 20 is positioned leaning against the support structure 10 to reduce the overall space occupied by the seat 1;
 at least one movable armrest 31 or 32, movably connected to the support structure 10 to move between a position of use and a position of non-use, in which the armrest 31,32 is positioned leaning against the support structure 10 to reduce the overall space occupied by the seat; and means 40 for moving the seating portion 20 from the position of use to the position of non-use.

In general, the seating portion 20 and the armrest 31, 32 may perform any movement to move between the position of non-use to that of use, for example rotatory, translatory, rototranslatory etc. As described further below, preferably both the seating portion and the armrest move between the two operating positions with a rotation movement around a hinging axis. Preferably, in their rotation movement, both the seating portion and the armrest/s rise when passing from the position of use to the position of non-use, and descend when passing from the position of non-use to the position of use. Solutions may however be provided wherein the rising/lowering movement is inverted, that is to say the seating portion and the armrests rise to move into the position of use and descend to move into the position of non-use.

In the continuation of the description, the position of use of the seating portion and of the armrest may also be denominated as an "open position" and the position of non-use as the "closed position".

According to the invention, the armrest 31, 32 is kinematically connected to the seating portion so that the armrest is moved from the position of use (open) to the position of non-use (closed) by the movement of the seating portion from the position of use (open) to the position of non-use (closed).

Thanks to the aforementioned kinematic connection between the seating portion and the single armrest (or two armrests, if provided, as described further below)—when the seating portion moves from the open position to the closed position to reduce the overall space occupied by the seat—the single armrest or armrests are also automatically moved from the open position to the closed position. This way, when the seat is not occupied by a user, the seat always finds itself in the minimum space-occupying configuration i.e. with seating portion and armrest/s in the closed position. The armrests are thus prevented from remaining open once the seat has been vacated and the seating portion is closed, pointlessly leaving the seating portion in a position occupying space. As well as a reduction of the space occupied, this also increases safety, given that the armrests-especially with the seating portion closed, if left open, that is projecting from the outline of the seat, may constitute dangerous blunt elements causing tripping up inasmuch not clearly visible given their generally limited size.

Preferably, the armrest 31, 32 is kinematically connected to the seating portion so as to be concerned only by the closure movement of the seating portion i.e. by the movement which the seating portion 20 performs when passing from the position of use (open) to the position of non-use (closed). This way the automatic closure of the armrest/s occurs only with the closing of the seating portion.

In particular, the armrest 31, 32 is kinematically released from the movement of the seating portion 20 when the armrest 31, 32 is in the position of non-use (i.e. closed). This way the "automatic" opening of the armrest/s determined by the opening of the seating portion is avoided.

Advantageously, in particular, the armrest 31, 32 is movable between the positions of use (open) and non-use (closed) independently of the seating portion, when the seating portion 20 is in the position of use. This way, when occupying the seat 1, the user is free to choose whether to open or close the armrest/s.

Preferably, as already mentioned, the seating portion 20 moves between a position of use (open) and a position of non-use (closed) with a rotation movement around a first rotation axis X1 (as provided for in the embodiments illustrated in the appended Drawings for example). The aforesaid means 40 for moving the seating portion 20 are suitable for moving the seating portion 20 around such first rotation axis X1.

Advantageously, the means 40 for moving the seating portion 20 comprise a first support pin 42 positioned along the first rotation axis X1 and at least one rotation device 41 suitable for applying a rotation momentum to the support pin 42. The support pin 42 also acts as the rotation pin of the seating portion.

Preferably, such at least one rotation device 41 opposes the movement of the seating portion 20 from the position of non-use (closed) to the position of use (open).

According to the embodiment illustrated in FIGS. 1 to 9, the aforesaid at least one rotation device 41 consists of at least one torsion spring coaxially associated to the support pin 42. Preferably, there are two or an even number of springs, symmetrically distributed, to obtain a more even distribution of the forces.

Alternatively, the means 40 for moving the seating portion 20 comprise a support pin 142, positioned parallel to the first rotation axis X1 in relation to which the seating portion rotates, and at least one rotation device 141 for applying a rotation momentum to such support pin 142.

In this case the support pin 142 does not coincide with the first rotation axis X1 in relation to which the seating portion rotates. This configuration makes it possible to compact the seating portion further and thus reduce the space occupied by the seat. In addition, this configuration makes it possible to increase the seating comfort avoiding the positioning of the support pin directly under the area where the coccyx rests.

According to the embodiment illustrated in FIGS. 10 to 21, the aforesaid at least one rotation device 41 (offset in relation to the rotation axis X1) consists of at least one torsion spring coaxially associated to the support pin 142. Preferably, there are two or an even number of springs, symmetrically distributed, to obtain a more even distribution of the forces.

According to embodiments not illustrated in the appended Drawings, the rotation device provided in the solutions described above and illustrated in FIGS. 1 to 9 or 10 to 21, may also consist of at least one gas spring or at least one gas piston, positioned in this case suitably offset in relation to the support pin. Advantageously, as a rotation device, any other device able to apply a rotation momentum to the rotation pin may be used.

Preferably, as shown in the appended drawings, the seat 1 comprises two armrests 31, 32 connected to the support structure on two opposite sides.

In particular, when the seating portion 20 is in the position of use each of the two armrests 31 or 32 is movable between the positions of use (open) and non-use (closed) independently of the seating portion.

In particular, as provided for in the embodiments illustrated in the appended Drawings, when the seating portion 20 is in the position of use, each of the two armrests 31 or 32 is movable between the positions of use (open) and non-use (closed) independently of the other armrest 31 or 32 too. This is made possible by the fact that the two armrests 31 and 32 are not connected to each other directly from a kinematic point of view.

It is however also possible to provide that the armrests are directly kinematically connected, so that their movement is always co-ordinated.

Advantageously, as described further below, the seating portion 20 is connected to the armrest 31, 32 by kinematic connection means 152 or 252. Such kinematic connection means 152 or 252 drag the armrest in rotation from the position of use (open) towards the position of non-use (closed), when the seating portion moves from the open position to the closed position.

Preferably, the aforesaid kinematic connection means 152 or 252 are structured so as to create a one-way constraint between the seating portion 20 and the single armrest 31, 32 such that the armrest 31, 32—when open—is kinematically concerned only by the closure movement of the seating portion 20 (i.e. movement from the position of use/open to the position of non-use/closed). The one-way constraint is thus structured so that, when the armrest is in the closed position and/or when the seating portion moves from the closed position to the open position, the armrest is kinematically independent of said seating portion.

In particular, as described in detail below, the kinematic connection means may comprise a non-rigid connection element 152 or alternatively may comprise a rod kinematism 252.

According to an embodiment not illustrated in the appended Drawing, the closure movement of the armrest may be entirely remitted to the means 40 for moving the seating portion from the position of use to that of non-use. In other words, the seating portion drags the armrest/s to closure with its closing movement thanks to the kinematic connection existing between said seating portion and the armrest (which will be described in more detail below). This solution is very simple from a technical and construction point of view in that it provides for a smaller number of components. In the case in which the closing movement of the seating portion is not sufficiently damped, to prevent brusque and dangerous closing of the armrest, it is preferable to provide the armrest with means for damping the movement, such as for example silicon brakes or similar devices. Damper devices such as for example gas pistons may be provided but this would cancel out the advantage of fewer components.

Preferably, the seat 1 comprises means 50 for moving the aforesaid at least one armrest 31 or 32 from the aforesaid position of use (open) to the aforesaid position of non-use (closed). Such movement means 50 are separate from the movement means 40 for moving the seating portion.

The use of separate means for closing the armrest/s and for closing the seating portion avoids the need for over sizing of the movement means of the seating portion. In addition, as described further below, damper means of the movement may be incorporated in the movement means of the armrest.

Advantageously, such means 50 of moving the armrest 31, 32 are kinematically connected to the seating portion 20 so as to be activated by the movement performed by the seating portion 20 when passing from the position of use (open) to the position of non-use (closed).

Preferably, the means 50 of moving the armrest 31, 32 are kinematically connected to the seating portion so as to be activated only by the closure movement of the seating portion i.e. by the movement which the seating portion 20 performs when passing from the position of use (open) to the position of non-use (closed). This way the automatic closure of the armrest/s occurs only with the closing of the seating portion.

In particular, the means 50 for moving the armrest 31, 32 are kinematically released from the movement of the seating portion 20 when the armrest 31, 32 is in the position of non-use (i.e. closed) This way the "automatic" opening of the armrest/s determined by the opening of the seating portion is avoided.

Some specific embodiments will now be described in detail. For ease of description, reference will be made to a single armrest. Such description should be extended to any second armrest, in the case in which the seat is provided with two armrests, in such case the two armrests preferably being identical in terms of general structure and functioning.

The embodiments described below in detail both provide for the presence of movement means 50 to move the armrest, separate from the means 40 for moving the seating portion. All the characteristics provided relative to the seat—in particular, those relative to the kinematic connection means 152, 252 (except for those relative to the means for moving the armrest) may however also refer—jointly or separately from each other—to embodiments not illustrated in the appended Drawings in which the aforesaid means for moving the armrest are not provided and the closure movement of the armrest is entirely remitted to the means 40 for moving the seating portion from the position of use to that of non-use.

According to the two embodiments illustrated in the appended Drawings, the single armrest 31, 32 is hinged to the support structure 10 to rotate around a second rotation axis X2. The means 50 for moving the single armrest comprise at least one pusher 51 rotationally connected at a first attachment end 51a to the support structure 10 and at a second attachment end 51b to the armrest 31, 32.

Preferably, the pusher is of the damped type, such as for example a gas piston (as shown in the appended drawings) or a gas spring, to prevent an excessively brusque or rapid movement of the armrest.

When the armrest 31, 32 is in the position of use (open), between the second rotation axis X2 and the thrust axis Y of the pusher, which passes through the two attachment ends 51a and 51b of said pusher, there is a distance D such that, under the thrust of the pusher, a rotation momentum M1 is determined insufficient to move the armrest from the position of use.

Advantageously, the seating portion 20 is connected to the armrest 31, 32 by the aforementioned kinematic connection means 152 or 252. Such kinematic connection means 152 or 252 drag the armrest in rotation from the position of use (open) towards the position of non-use (closed), when the seating portion moves from the open position to the closed position. In particular, such kinematic connection means 152 or 252, dragging the armrest in rotation from the open position towards the closed position, increase the distance D existing between the second rotation axis X2 and the thrust axis Y of the pusher 51. This dragging effect occurs at least until the armrest has reached a critical angular rotation position at which, under the thrust of the pusher 51 the distance D between the second rotation axis X2 and the thrust axis Y of the pusher is such as to determine a sufficient rotation momentum M2 to complete the movement of the armrest as far as the position of non-use.

Preferably, the aforesaid kinematic connection means 152 or 252 are structured so as to create a one-way constraint between the seating portion 20 and the single armrest 31, 32 such that the armrest 31, 32—when open—is kinematically concerned only by the closure movement of the seating portion 20 (i.e. movement from the position of use/open to the position of non-use/closed). The one-way constraint is thus structured so that, when the armrest is in the closed position and/or when the seating portion moves from the closed position to the open position, the armrest is kinematically independent of said seating portion.

According to the embodiment illustrated in FIGS. 1 to 9, the kinematic connection means comprise a non-rigid connection element, which, in particular in FIGS. 1 to 9 is shown as a chain 152. The non-rigid connection element may also consist of a steel rope or any other non-rigid element of suitable tensile strength.

In particular, as shown in particular in FIGS. 5 to 9, the non-rigid connection element 152 is connected at a first end 152a to the seating portion 20 and at a second end 152b to the single armrest 31, 32 in an offset position from the second rotation axis X2. The non rigid connection element 152 is positioned in relation to the armrest 31, 32 and to the seating portion 20 in such a way that such element is tensioned, rotating the armrest from the position of use (open) to the position of non-use (closed) only when the seating portion 20 moves from the position of use (open) to the position of non-use (closed). The non-rigid connection element 152 remains taut until the armrest has reached the critical angular position (see FIG. 8) at which the pusher 51 (in particular a gas piston) makes the armrest start to rotate.

Figure 5:
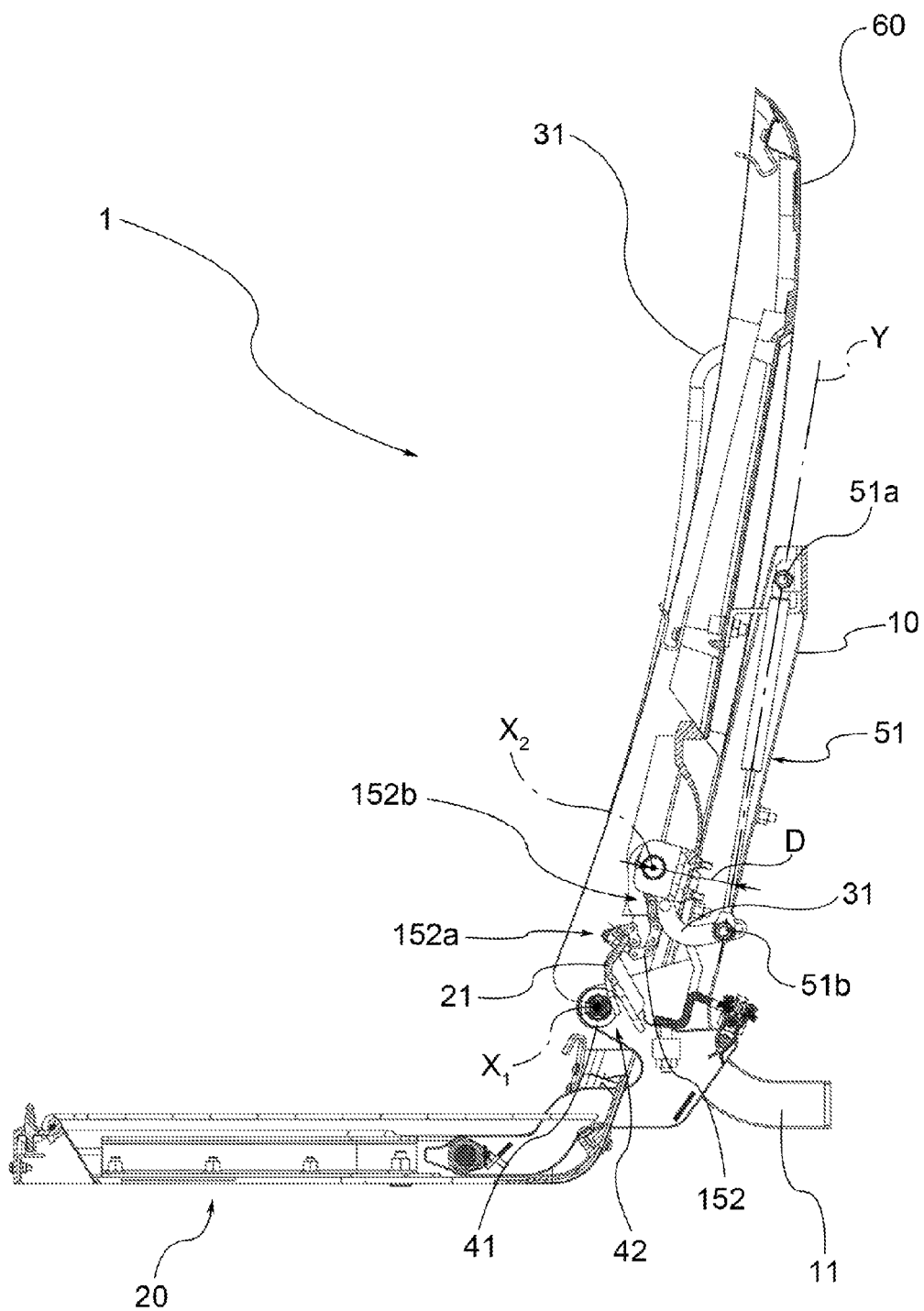
FIG. 5 shows a cross-section view of the support structure shown in FIG. 4 according to the cross-section plane V-V shown therein.
Figure 6:
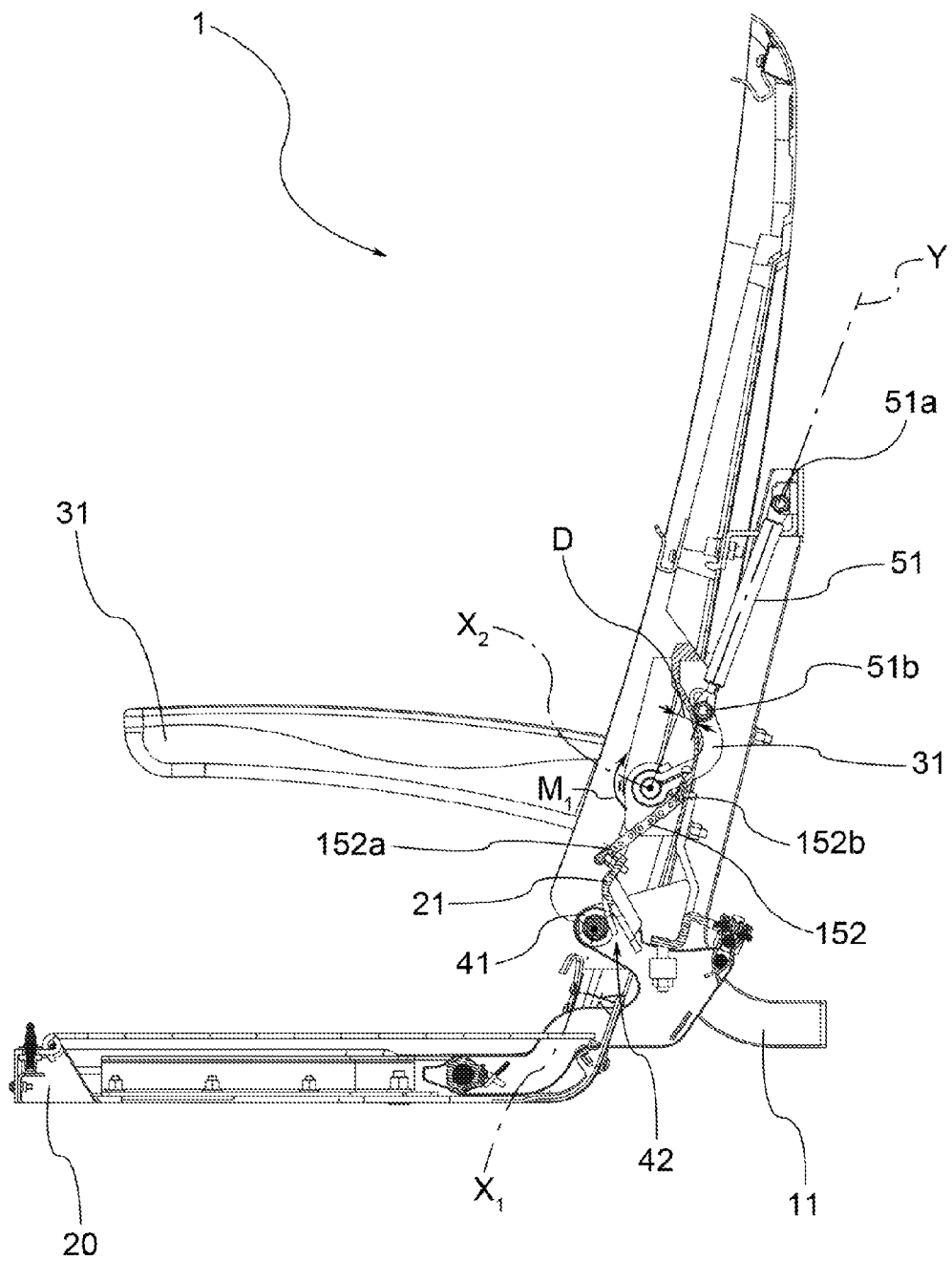
FIGS. 6 to 9 shows cross-sections views according to the cross-section plane V-V shown in FIG. 4 of the support structure of the seat in FIG. 4, illustrated in different operating configurations assumed by the moving parts.
Figure 7:
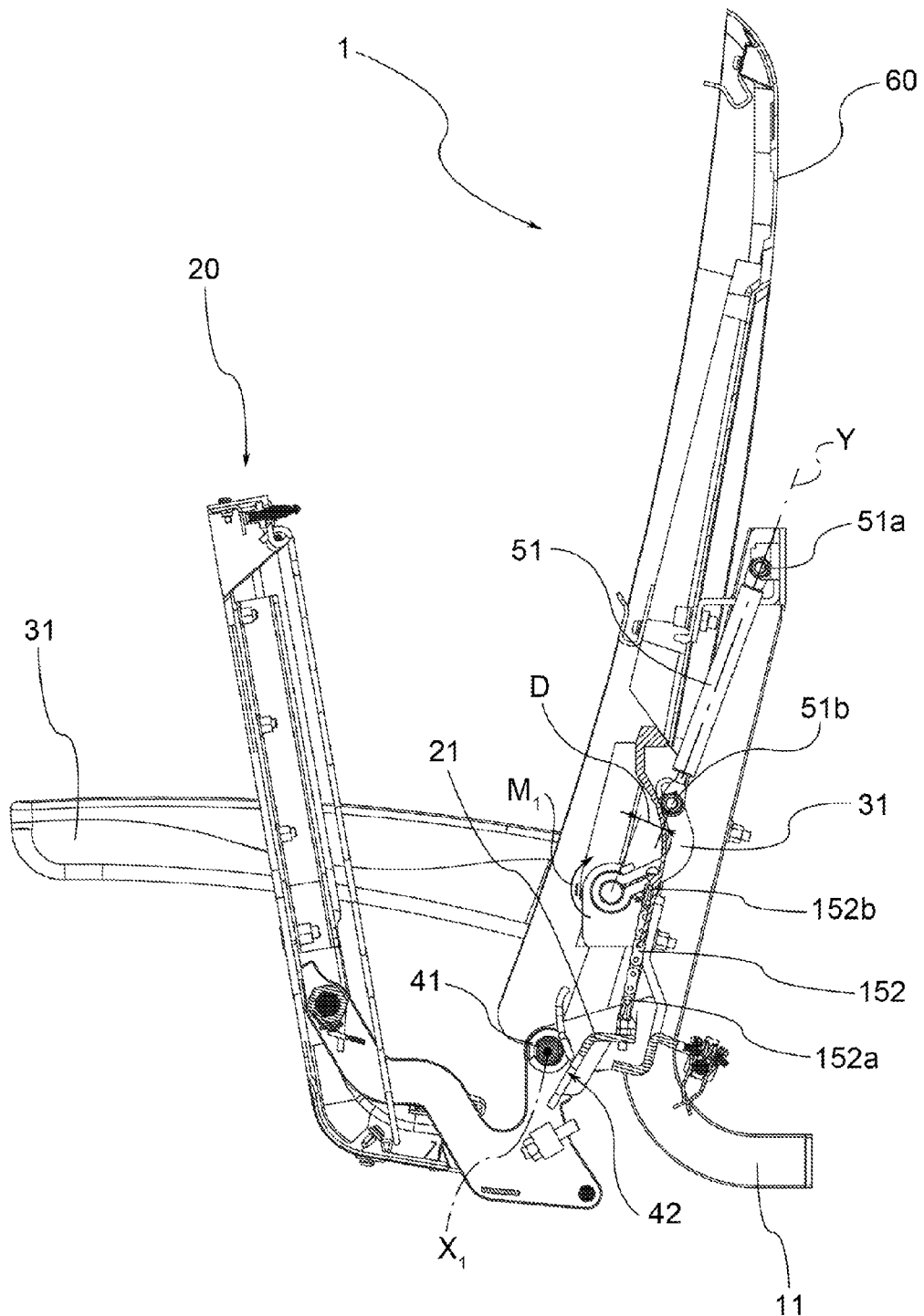
Figure 8:
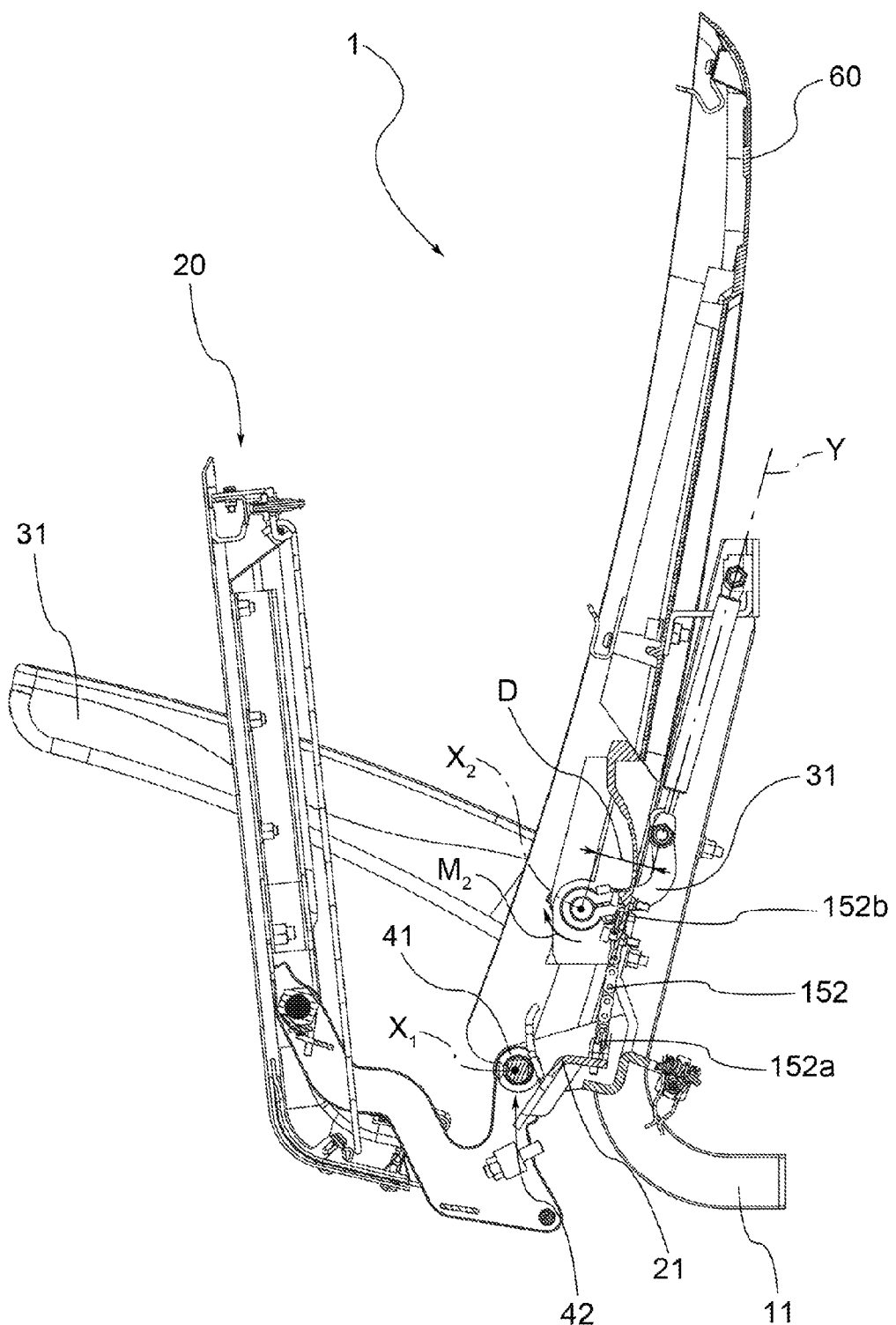
Figure 9:
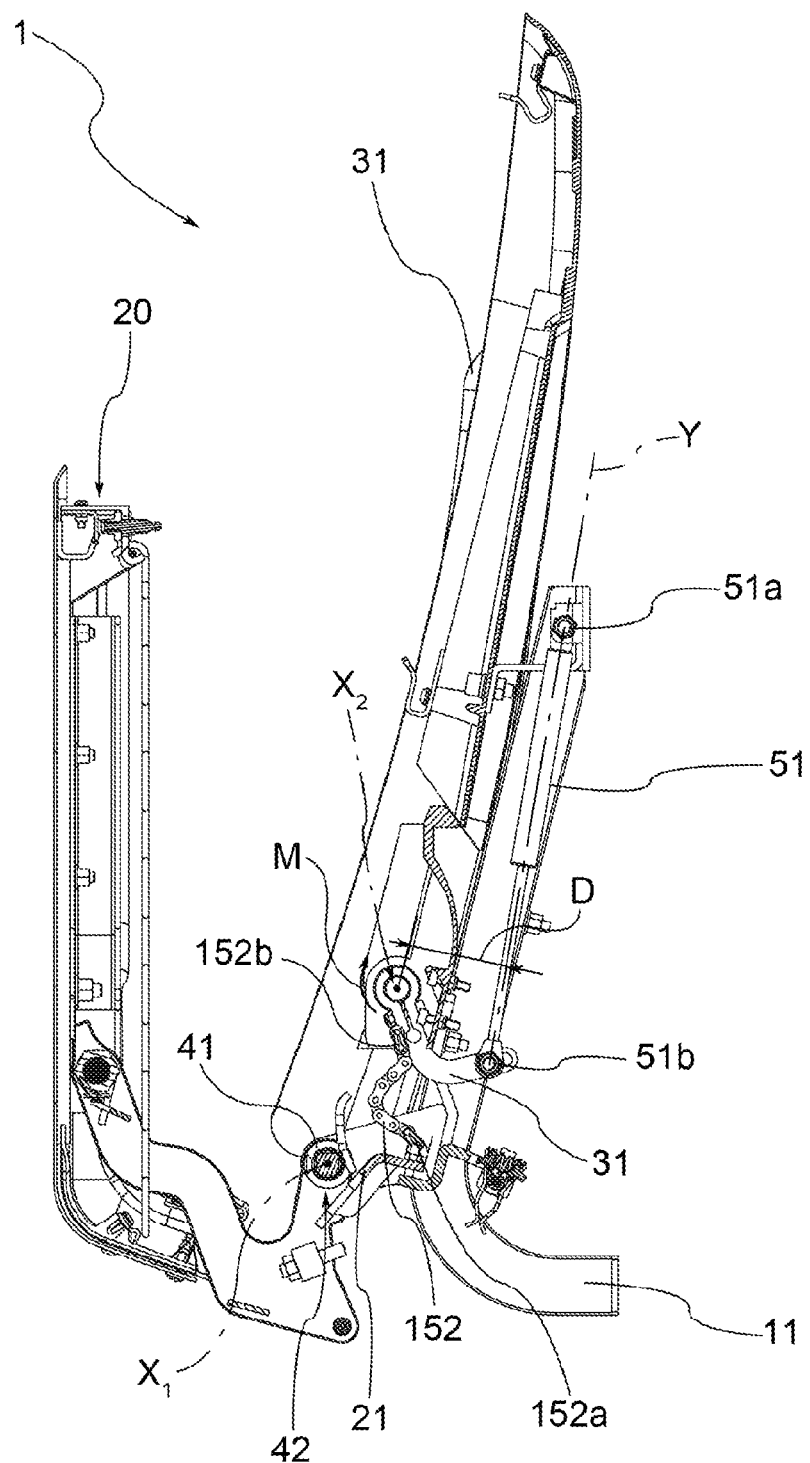
Figure 15:
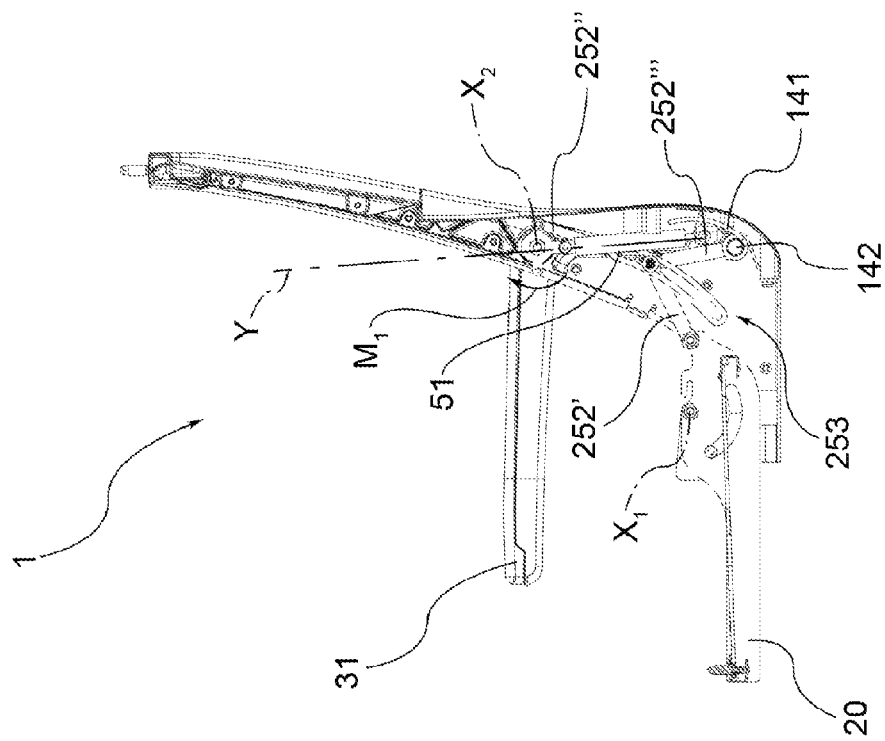
Figure 14:
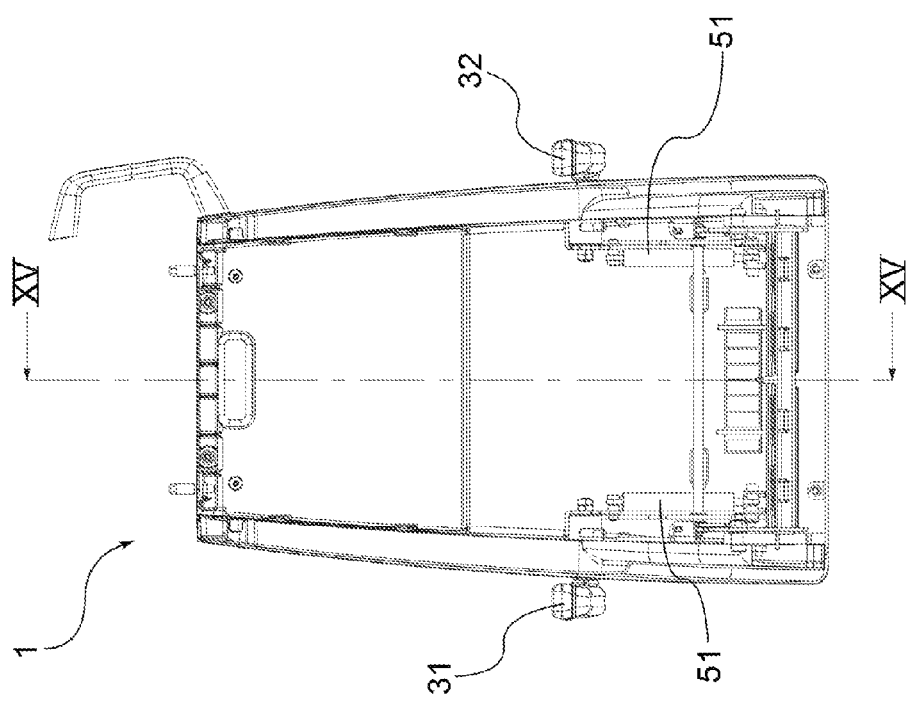
Figure 17:
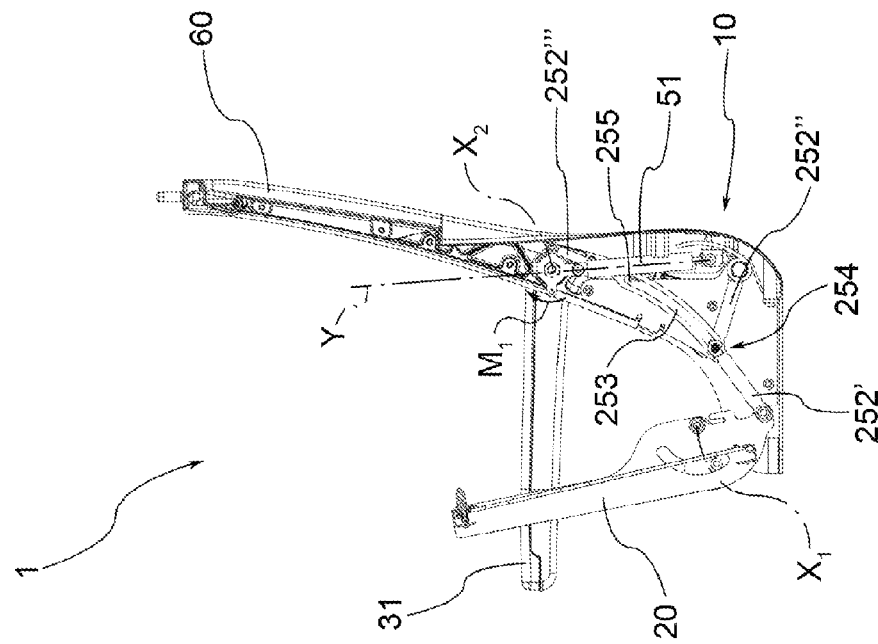
Figure 16:
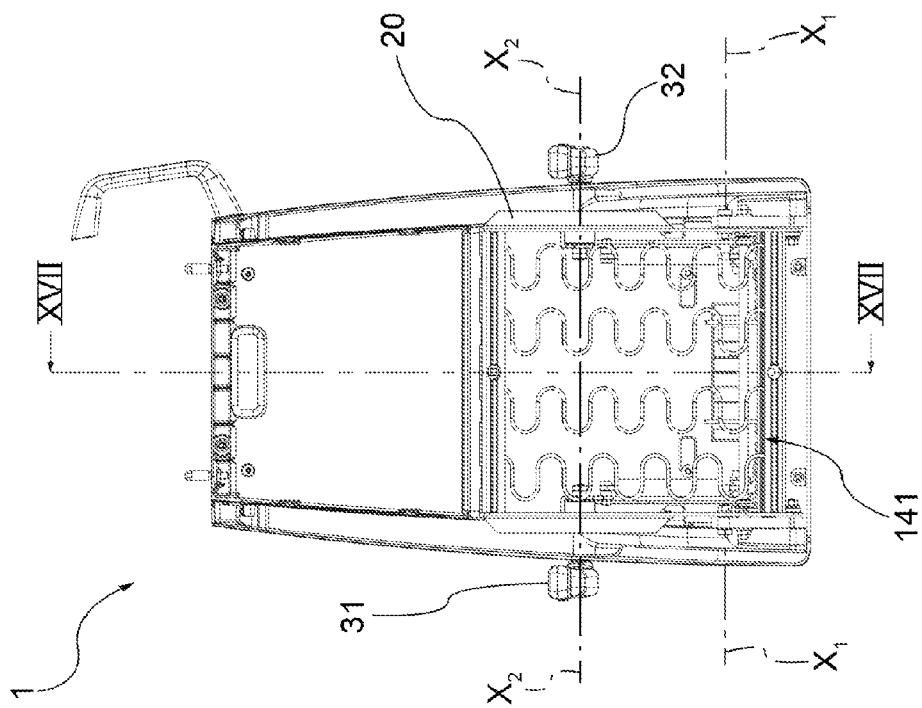
Figure 19:
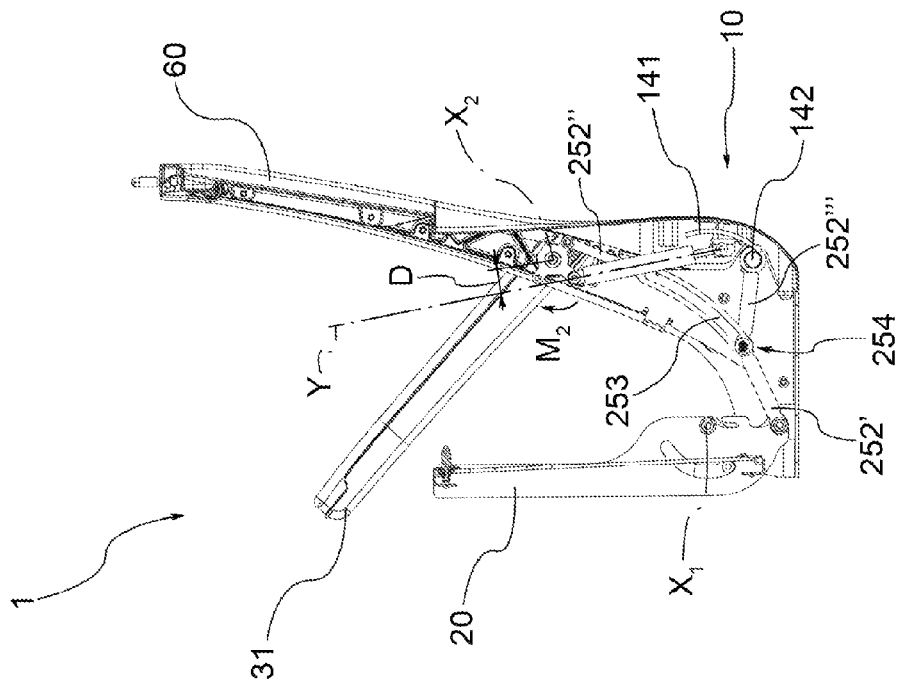
Figure 18:
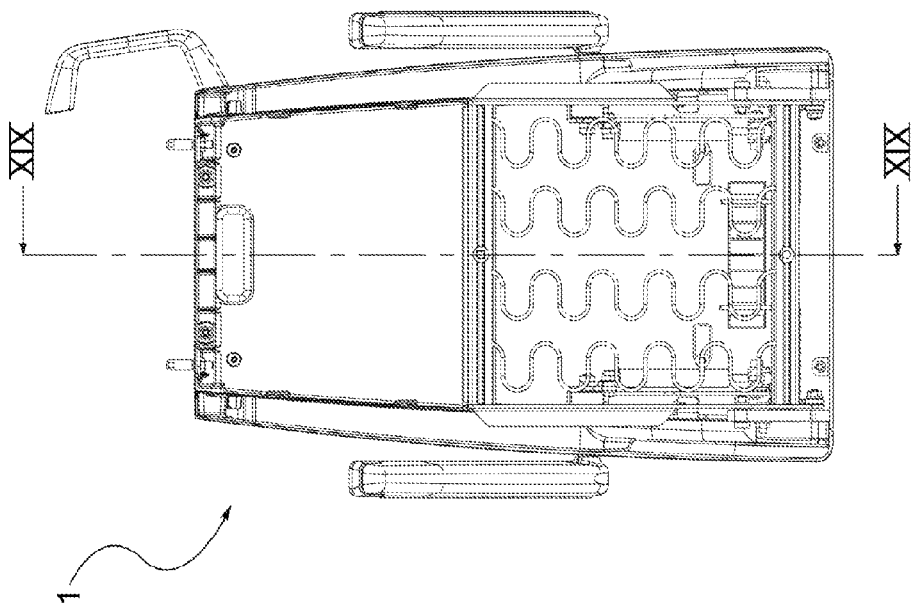

As shown in FIGS. 5 and 9, when the single armrest 31, 32 is in the closed position, the non-rigid connection element 152 is not taut, independently of the fact of whether the seating portion is in the position of use/open (FIG. 5) or in the position of non-use/closed (FIG. 9). This way, when the seating portion is in the position of use/open, the armrest can be moved independently of the seating portion allowing the user to choose the position of the armrest. In addition, the second armrest (if present) is kinematically independent of the first, the kinematic connection between the two armrests being made by means of the seating portion. Conversely, when the seating portion is in the position of non-use/closed, if the armrest is moved from the closed position towards the open position, the non-rigid connection element 152 is tensioned and a further forcing in rotation of the armrest towards such open position would drag the seating portion towards the position of use/open.

More specifically, the non-rigid connection element 152 is connected at a first end 152a to a dragging portion 21 of the seating portion 20. Operatively, such portion 21 is positioned in relation to the first rotation axis X1 (around which the seating portion rotates) in such a way that, when the seating portion 20 moves from the position of use/open to the position of non-use/closed, such portion 21 moves away from the point in which the second end 152b of the non-rigid connection element is attached to the armrest 31 or 32.

According to the embodiment illustrated in FIGS. 10 to 21, the kinematic connection means comprise a rod kinematism 252.

In particular, as shown in particular in FIGS. 13, 15, 17, 19 and 21, such rod kinematism 252 comprises at least two rods, of which a first rod 252' is hinged to the seating portion 20 and a second rod 252" is hinged to the armrest 31, 32 in an offset position from the second rotation axis X2.

More specifically, one of the two rods 252" has a guide portion 253 which extends between two end stops 254 and 255. In particular, the guide portion 253 may consist of an elongated shape opening. The other rod 252' is engaged so as to slide and rotate along the guide portion 253. The guide portion 253 is sized so that the kinematism 252 only begins to drag the armrest 31, 32 in rotation when the rod 252' engaged in the guide portion 253 has reached one of the end stops 254, 255 of the guide portion 253.

Advantageously, in the case in which the means 40 for moving the seating portion 20 comprise a support pin 142, which does not coincide with the first rotation axis X1 in relation to which the seating portion rotates (as provided for in the embodiment shown in FIGS. 10 to 21), the rod kinematism 252 comprises a third rod 252''' which is integral with the support pin 142, which the rotation device 141 (in particular a torsion spring) is associated to, and is hinged to the first rod 252' to transmit to the seating portion 20 the rotation movement imposed by the rotation device 141. Operatively, the rotation device 141 opposes the movement of the seating portion 20 from the position of non-use to that of use.

More specifically, the guide portion 253 is made on the second rod 252", hinged to the armrest. The first rod 252' (hinged to the seating portion) and the third rod 252''' (integral with the support pin 142) are reciprocally hinged to each other.

Preferably, as shown in particular in FIGS. 13, 15, 17, 19 and 21, the first rod 252' and the third rod 252''' are both engaged so as to slide and rotate in the guide portion 253 made in the second rod 252". The first and the third rod 252'e 252''' engage the guide portion at the point of their reciprocal hinging.

As shown in particular in FIG. 11, the rod kinematisms of the two armrests 31 and 32 may be reciprocally connected by a connection rod 256 which connects the reciprocal hinging points of the first 252' and the third 252''' rod of the two kinematisms.

The embodiment with rod kinematism is mechanically more reliable than the embodiment with the non rigid connection element (chain or rope). In fact the risk of jamming related to the presence of the non-rigid connection element is avoided. The rod kinematism solution is, in addition, more compact, and less subject to vibrations and thus less noisy (think for example of the vibrations generated in a railway carriage when the train is moving or stationary). It is also easier to assemble, especially if compared to the solution with a non-rigid element consisting of a chain (the links joined with relative split pins used to fasten the chain are avoided).

According to an embodiment not illustrated in the appended Drawings, the means for moving the single armrest may comprise—alternatively or in addition to the pusher 51 (for example, consisting of a gas piston) a torsion spring positioned coaxially to the rotation axis of each armrest. The kinematic connection means between the seating portion and the armrest may in particular be the same as those described above (non rigid connection element or rod kinematism). In the case in which the torsion spring replaces the pusher, to prevent brusque and dangerous closing of the armrest, it is preferable to provide the armrest with damper means of the movement, such as for example silicon brakes or similar devices.

According to a further alternative embodiment (not shown in the appended Drawings and already mentioned above), the means for moving the armrest may be made to coincide with the means 40 for moving the seating portion. In other words, the closing movement of the armrest depends entirely on the closing movement of the seating portion, that is to say the armrest is not provided with independent movement means. As already mentioned above, the kinematic connection means between the seating portion and the armrest may in particular be the same as those described above (non rigid connection element or rod kinematism). To prevent brusque and dangerous closing of the armrest it is preferable to fit the armrest with damper means of the movement, such as for example silicon brakes or similar devices.

The invention permits many advantages to be obtained, some of which already pointed out above.

The seat with tipping seating portion according to the present invention, despite being provided with moving armrests, always assumes the space-saving configuration when left vacant by a user.

The seat 1 according to the invention permits a movement of the armrests independent of the seating portion, when the seating portion is in the position of use/open.

The seat 1 according to the invention permits the contemporary closing movement of the seating portion and of the armrests in a simple and automatic mechanical manner, without the need for motorised means.

The seat 1 according to the invention is lastly easy and economical to produce.

The invention thus conceived thereby achieves the intended objectives.

Obviously, its practical embodiments may assume forms and configurations different from those described while remaining within the sphere of protection of the invention.

Furthermore, all the parts may be replaced with technically equivalent parts and the dimensions, shapes and materials used may be varied as required.

The invention claimed is:

1. A seat with tipping seating portion for vehicles, comprising:
   a support structure, destined to be anchored to a vehicle;
   a tipping seating portion, movably connected to the support structure to move between a position of use and a position of non-use, in which the seating portion is positioned leaning against the support structure to reduce the overall space occupied by the seat;
   at least one movable armrest, movably connected to the support structure to move between a position of use and a position of non-use, in which the armrest is positioned leaning against the support structure to reduce the overall space occupied by the seat;
   means for moving the seating portion from said position of use to said position of non-use,
   the armrest being kinematically connected to the seating portion so that the armrest is moved from the position of use to the position of non-use by movement of the seating portion from the position of use to the position of non-use;
   wherein the seating portion is connected to the armrest by kinematic connection means, which, when the seating portion moves from the position of use to the position of non-use, drag the armrest in rotation from the position of use towards the position of non-use;
   wherein the kinematic connection means are structured to create a one-way constraint between the seating portion and the at least one armrest such that the armrest placed in the position of use, is concerned only by the movement of the seating portion from the position of use to the position of non-use, so as to make the armrest kinematically independent of the seating portion, when the armrest is in the position of non-use or when the seating portion moves from the position of non-use to the position of use;
   wherein the kinematic connection means comprise a non-rigid connection element; and
   wherein the non-rigid connection element is connected at a first end to the seating portion and at a second end to the armrest in an offset position from the second rotation axis, the non-rigid connection element being positioned in relation to the armrest and to the seating portion in such a way that the non-rigid connection element is tensioned, moving the armrest in rotation, only when the seating portion moves from the position of use to that of non-use.

2. The seat according to claim 1, wherein the non-rigid connection element is connected at its first end to a dragging portion of the seating portion, the dragging portion moving away from the point in which the second end of the non-rigid connection element is attached to the armrest, when the seating portion moves from the position of use to that of non-use.

3. A seat with tipping seating portion for vehicles, comprising:
   a support structure, destined to be anchored to a vehicle;
   a tipping seating portion, movably connected to the support structure to move between a position of use and a position of non-use, in which the seating portion is positioned leaning against the support structure to reduce the overall space occupied by the seat;
   at least one movable armrest, movably connected to the support structure to move between a position of use and a position of non-use, in which the armrest is positioned leaning against the support structure to reduce the overall space occupied by the seat;
   means for moving the seating portion from said position of use to said position of non-use,
   the armrest being kinematically connected to the seating portion so that the armrest is moved from the position of use to the position of non-use by movement of the seating portion from the position of use to the position of non-use;
   wherein the seating portion is connected to the armrest by a kinematic connector, which, when the seating portion moves from the position of use to the position of non-use, drags the armrest in rotation from the position of use towards the position of non-use;
   wherein the kinematic connector comprises a rod kinematism; and
   wherein the rod kinematism comprises at least two rods, of which a first rod is hinged to the seating portion and a second rod is hinged to the armrest in an offset position from the second rotation axis, one of the two rods having a guide portion which extends between two end stops, the other rod being engaged so as to slide and rotate along the guide portion, the other rod being sized so that the kinematism only begins to drag the armrest in rotation when the rod engaged in the guide portion has reached one of the end stops of the guide portion.

4. The seat according to claim 3, wherein the means for moving the seating portion comprise a support pin, positioned parallel to the first rotation axis in relation to which the seating portion rotates, and at least one rotation device for applying a rotation momentum to said support pin and wherein the rod kinematism comprises a third rod which is integral with the support pin, to which said at least one rotation device is associated, and is hinged to said first rod to transmit to the seating portion the rotation movement imposed by the rotation device, the latter opposing the movement of the seating portion from the position of non-use to that of use.

5. The seat according to claim 4, wherein the guide portion is made on the second rod, hinged to the armrest, and wherein the first rod, hinged to the seating portion, and the third rod, integral with the support pin, are reciprocally hinged to each other.

6. The seat according to claim 5, wherein the first rod and the third rod are both engaged so as to slide and rotate in the guide portion made in the second rod, said two rods engaging in the guide portion at their point of reciprocal hinging.

* * * * *